Sept. 8, 1931.  J. McSKIMMING  1,822,781
WIRE SPACING AND FASTENING DEVICE
Filed March 29, 1930
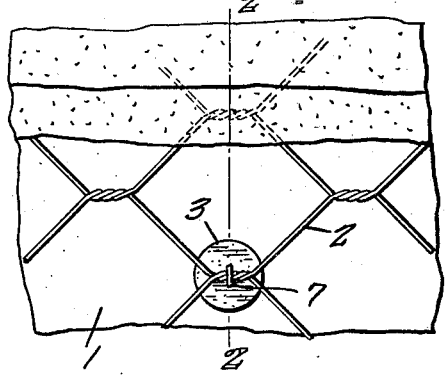
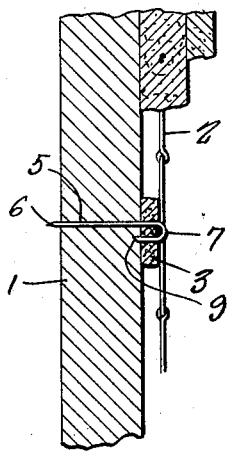
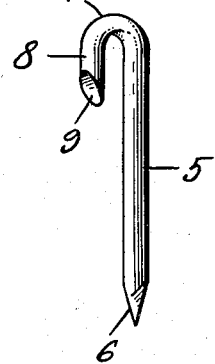
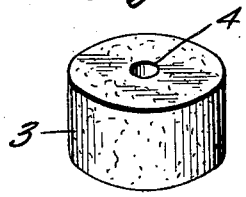
James McSkimming,
INVENTOR
BY Victor J. Evans
ATTORNEY
WITNESS:

Patented Sept. 8, 1931

1,822,781

UNITED STATES PATENT OFFICE

JAMES McSKIMMING, OF SANTA BARBARA, CALIFORNIA

WIRE SPACING AND FASTENING DEVICE

Application filed March 29, 1930. Serial No. 440,107.

My present invention has reference to a plastering construction and is directed to novel means for conveniently stretching and securing expanded laths or open woven wire, commonly termed chicken wire to furring elements and for securing such elements and lath to the structure to be plastered and the invention consists in the improvement hereinafter described and definitely claimed.

In the drawings:

Figure 1 is an elevation illustrating the application of my improvement.

Figure 2 is a sectional view approximately on the line 2—2 of Figure 1.

Figure 3 is a perspective view of the staple nail.

Figure 4 is a similar view of one of the furring discs.

In the usual manner of securing expanded metal laths or open woven wire to a structure to be plastered furring strips are arranged between the structure and the wire lath. The lath must be expanded to draw the same taut over the structure and ordinary headed nails are employed for this purpose. The lather experiences great difficulty in holding the wire taut and driving the nails into the strips and the structure and in addition to this the heads of the nails which project over the wire lath offer obstructions for the plaster. It may, therefore, be considered the primary object of this invention to provide furring elements in the nature of fibre discs that are provided with central openings in which the longer shanks of staple nails rest and which shanks may be partly driven into the structure so that the plaster can readily expand and draw the lath taut and, thereafter easily drive the nail home. The shorter shank or arm of the staple nail when driven home passes through the disc and also enters the structure, the rounded end between the arms of the staple forcing the portion of the lath engaged thereby into the fibre casing so that no projection is afforded after the staple nail is driven home that will serve as an obstruction to the plasterer's trowel. Also with my improvement the discs employed are comparatively small so that the plaster will be properly keyed in the lath throughout the wall surface.

Referring now to the drawings the numeral 1 designates a wooden structure designed to have one of its faces coated with plaster. The numeral 2 designates an expanded wire lath. In the showing of the drawings the wire lath is in the nature of an open woven wire member and is of a type commonly known as chicken fence wire.

Between the coiled or connected portions or strands of the wire and the structure 1 I arrange fibre discs 3. Each of the discs is formed with a central opening 4.

I employ staple nails, such as disclosed by Figures 1 and 2 of the drawings. Each of these nails includes a comparatively long arm or shank 5 that has a pointed end 6. The opposite end of the arm or shank 5 is rounded upon itself, as at 7, and is extended in parallelism, but in spaced relation to the shank or arm 5 to provide a shorter arm or barb 8 and the barb 8 has one of its faces cut angularly from its end so that the said end is sharpened, as at 9. The longer arm or shank 5 of the staple member is received through the opening 4 and discs 3 and the said arm or shank is partly driven into the structure 1. The wire lath 2 is now drawn taut and the staple nail is driven entirely home. This causes the shorter arm or barb 8 of the staple nail to pass through the fibre disc and to have its sharpened end enter the structure 1. The rounded portion 7 of the staple member will also compress the portion of the wire lath engaged thereby to embed the same in the outer face of the fibre disc 3 so that the staple nail offers no projection which will interfere with the troweling of the mortar on the lath.

The construction and advantages of the invention will be apparent to those skilled in the art to which such invention relates so that further detailed description will not be required.

Having described the invention, I claim:

In a plastering construction, a structure to be plastered, an expanded metal lath arranged over the face of the structure, fibre discs between the lath and the structure, each of which having a central opening therethrough, a staple nail which includes a shank having a pointed end and of a length to pass through the disc and through the structure, said shank designed to be received through the opening in the fibre disc and to be partly driven into the structure when the metal lath is drawn taut, the second end of the shank being rounded and merging into a shank which is comparatively short with respect to the first mentioned shank and which short shank has its face cut angularly to provide the same with a sharpened end and said shorter shank when the staple nail is driven home is designed to pass through the fibre disc and to partly enter the structure to compress the portion of the lath engaged by the staple nail into the fibre disc.

In testimony whereof I affix my signature.

JAMES McSKIMMING.